United States Patent [19]

Grandchamp et al.

[11] Patent Number: 5,401,173
[45] Date of Patent: Mar. 28, 1995

[54] COAXIAL CONNECTOR ACCOMMODATING DIFFERENTIAL EXPANSION

[75] Inventors: Brett J. Grandchamp, South Portland; Cole N. Plummer, South Casco; Richard I. Bibber, Gray; Charles D. Brown, Raymond, all of Me.

[73] Assignee: General Signal Corporation, Stamford, Conn.

[21] Appl. No.: 203,273

[22] Filed: Feb. 28, 1994

[51] Int. Cl.⁶ ............................................. H01P 1/04
[52] U.S. Cl. ................................. 439/33; 333/260; 174/88 C
[58] Field of Search ............... 439/33; 174/28, 88 C, 174/91; 333/243–245, 260

[56] References Cited

U.S. PATENT DOCUMENTS

| | | | |
|---|---|---|---|
| 2,955,148 | 10/1960 | Graham et al. | 174/88 C |
| 3,373,242 | 3/1968 | Sewell | 333/244 |
| 3,955,871 | 5/1976 | Kruger | 333/260 |
| 4,390,218 | 6/1983 | Kruger | 439/33 |
| 4,763,090 | 8/1988 | Pitschi | 439/33 |
| 5,341,116 | 8/1994 | Kerkhoff et al. | 439/33 |

OTHER PUBLICATIONS

David Dettinger—"The Optimum Spacing Of Bead Supports In Coaxial Line At Microwave Frequencies'—Wheeler Laboratories, Inc., Great Neck, N.Y., pp. 250–253.

*Primary Examiner*—Gary F. Paumen
*Attorney, Agent, or Firm*—Henry D. Pahl, Jr.

[57] ABSTRACT

The coaxial connector disclosed herein accommodates differential expansion between inner and outer conductors in a multi-section run of coaxial transmission line by utilizing a coupler assembly which connects adjacent inner conductors, one of the inner conductors being fixedly connected to the coupler with axial movement being permitted with respect to the other inner conductor. Electrical connection between the coupler and the movable conductor is established at a single axial position by an annular conductive spring member while longitudinal alignment is maintained over the rest of the length of the coupler by insulating rings set into annular grooves. A tubular shield extends from the coupler over the adjacent end of the movable inner conductor without electrical contact. The axial length of the shield is larger than the differential expansion which occurs between inner and outer conductor sections. The shield masks the gap at end of the movable inner conductor which is otherwise variable with differential expansion and thereby minimizes the changes in impedance at the connector.

6 Claims, 2 Drawing Sheets

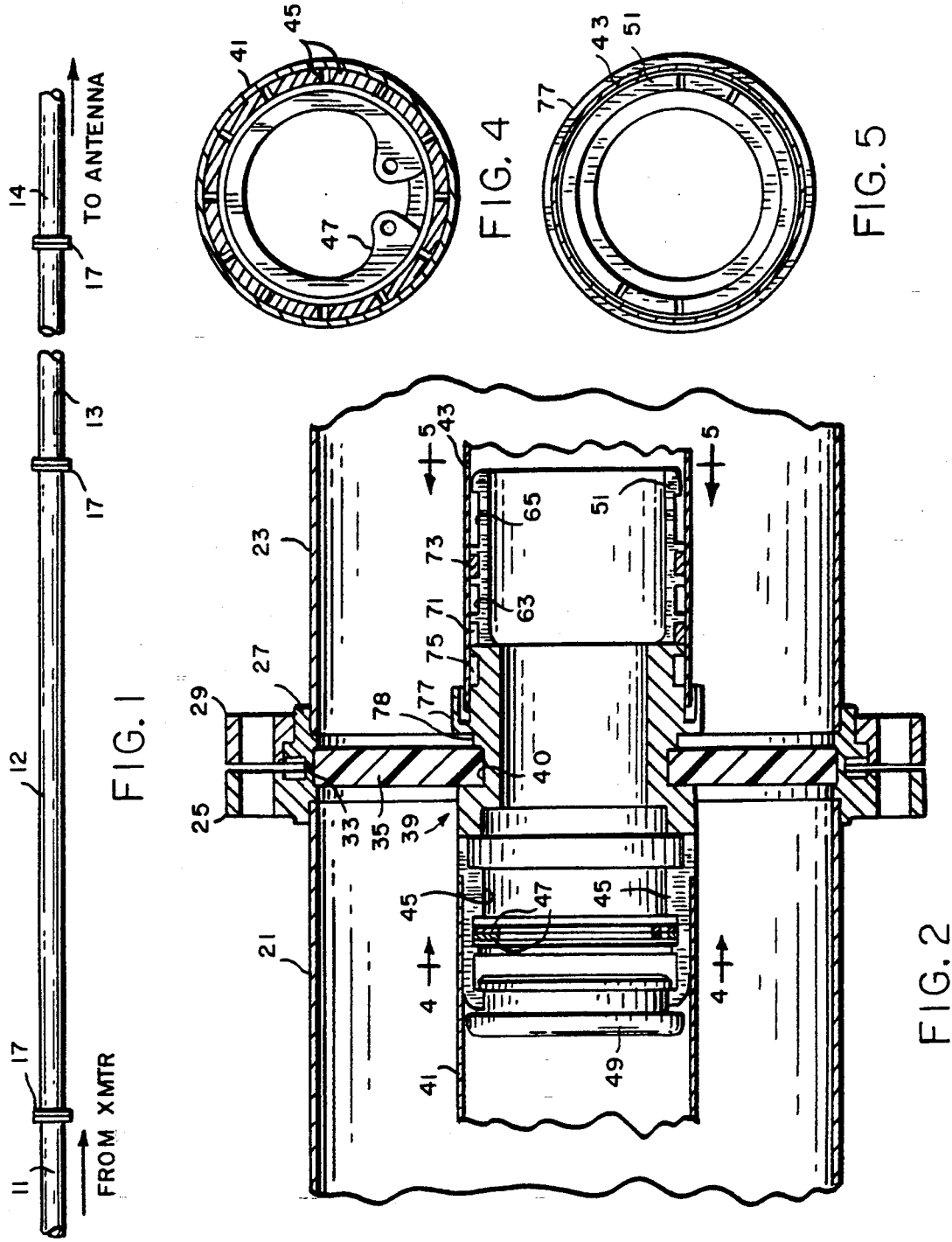

COAXIAL CONNECTOR ACCOMMODATING DIFFERENTIAL EXPANSION

BACKGROUND OF THE INVENTION

The present invention relates to coaxial connectors and more particularly to such a connector which will accommodate differential expansion between inner and outer tubular conductors in a multi-section run of coaxial transmission line.

As is understood by those skilled in the art, high power coaxial transmission lines are subject to differential expansion between the inner and outer conductors, due mainly to heating of the inner conductor by the r.f. power being transmitted. Typically, this differential expansion is dealt with in either of two ways. One expedient is to provide convolutions or corrugations in either the inner or outer conductor so that some axial compliance is available to take up the differential expansion. Another expedient is to provide an axial sliding joint for one of the inner conductors at each junction between coaxial sections. One problem with this latter technique, as practiced heretofore, however, has been that the sliding joint presented a variable impedance discontinuity which was difficult to compensate for. Further, the prior art expansion systems often exhibited inconsistent electrical conductivity characteristics and utilized metal to metal alignment contacts which could generate metal particles as a result of the rubbing action.

Among the several objects of the present invention may be noted the provision of a novel connector for sections of coaxial transmission line which accommodates differential expansion between the inner and outer conductors; the provision of such a connector which minimizes changes in impedance, particularly those which occur with such differential expansion; the provision of such a connector which provides a well defined point of electrical contact between the connector and the inner conductor; the provision of such a connector which reduces the generation of metal particles by sliding action; and the provision of such apparatus which is highly reliable and is of relatively simple and inexpensive constructions. Other objects and features will be, in part, apparent and, in part, pointed out hereinafter.

BRIEF DESCRIPTION OF THE DRAWINGS

FIG. 1 is an illustration of a multi-section run of a coaxial transmission line;

FIG. 2 is a side view, partially in section, of a connector of the present invention joining two of the sections of FIG. 1;

FIG. 4 is an end view of the coupler assembly taken substantially on the line 4—4 of FIG. 2; and FIG. 5 is an end view of the coupler assembly taken substantially on the line 5—5 of FIG. 2.

Corresponding reference characters indicate corresponding parts throughout the several views of the drawings.

DESCRIPTION OF THE PREFERRED EMBODIMENT

Figure 3:
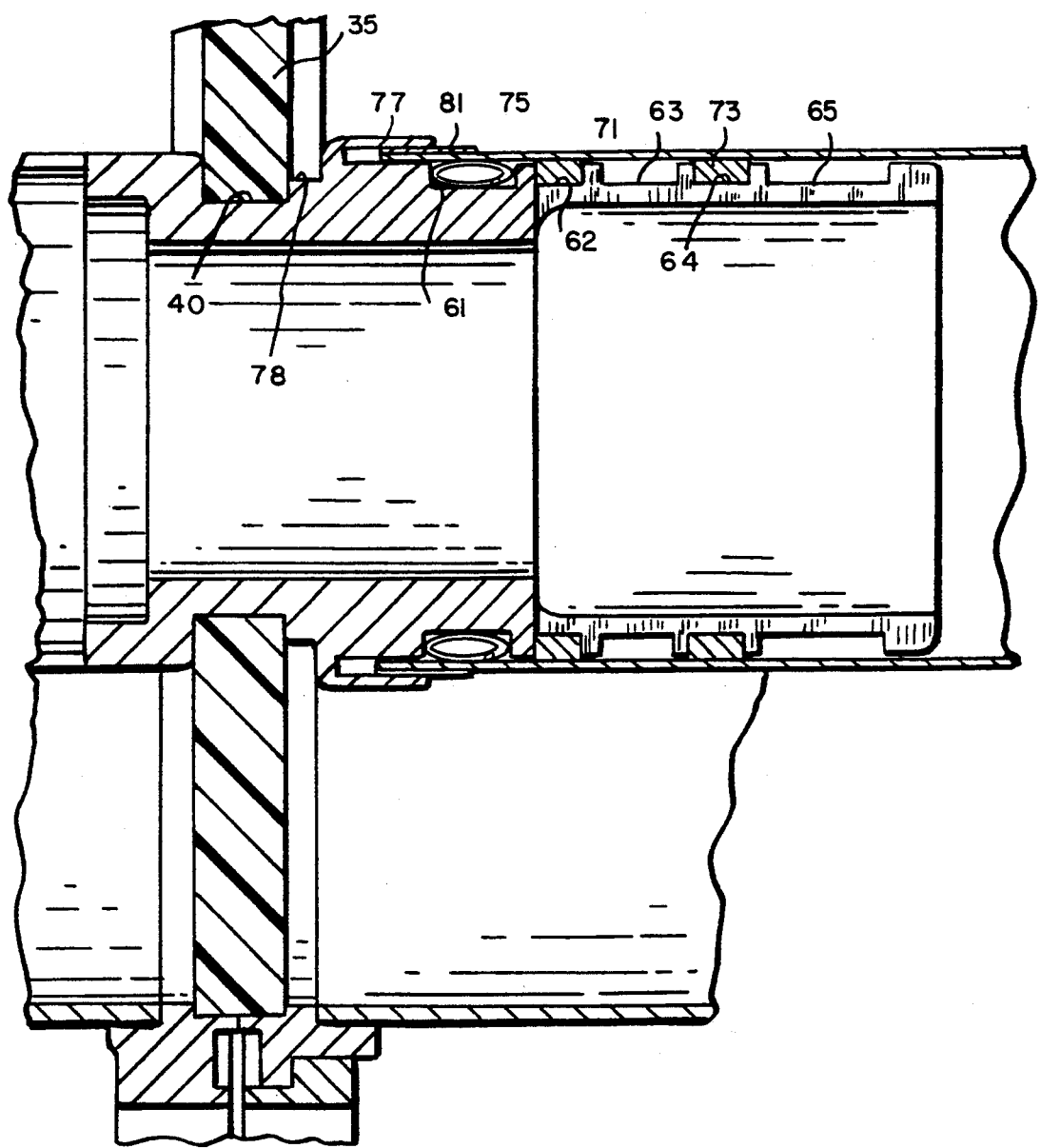
FIG. 3 is a side view of an enlarged scale showing the construction of the coupler assembly which joins inner conductors in the connector of FIG. 2.

Referring now to FIG. 1, the run of coaxial transmission line illustrated there comprises a plurality of sections 11-14 joined by connectors 17. As is understood, such a multi-section run of coaxial transmission line may be used to connect a television transmitter to an antenna located an appreciable distance away. Such lengthy runs are necessarily made up of sections since the length of a coaxial transmission line segment which can be shipped is limited as are the lengths of appropriate tubing available commercially. In the particular embodiment being described by way of example, the outer conductors of the coaxial transmission line are six and one eighth inch in diameter and the individual sections are about twenty feet long. With such lengths it is desirable to provide accommodation for differential axial expansion between the outer conductor and inner conductor of about ¼ inch per section. Such accommodation is provided by the connectors 17 which are constructed as illustrated in greater detail in FIG. 2-5.

Referring now to FIG. 2, the outer conductors of adjacent coaxial line sections are designated by reference characters 21 and 23. A one piece coupling flange 25 is welded to the right hand end of the outer connector 21 while the conductor 23 is provided with a two part flange assembly having an inner ring 27 which is welded to the conductor 23 and an outer, rotatable clamping ring 29 which can be bolted to the flange 25 to draw the two sections together into solid electrical contact.

The flange 25 and ring 27 are cut away as illustrated, to provide a recess, as designated by reference character 33, which can capture and retain an annular anchor insulator 35 when the outer sections are bolted together. The anchor insulator 35 serves to locate a coupler assembly, designated generally by reference character 39, which joins adjacent inner conductor sections 41 and 43. The anchor insulator is received within a groove 40 in the coupler assembly. Anchor insulator 35 may, for example, be constructed of teflon and is preferably split so as to allow it to be assembled over the coupler assembly 39.

The left-hand side of the coupler assembly 39 is essentially conventional and is adapted to fixedly attach to the adjacent end of the respective inner conductor 41. The end of the left hand portion of the coupler assembly is axially cut at several circumferential positions as illustrated in FIG. 4 so as to form radially compliant fingers 45. These fingers are then resiliently forced outwardly into firm contact with the conductor 41 by snap ring springs 47. An annular plug 49 prevents splitting the finger apart if there is an initial misalignment during assembly.

The right-hand side of the coupler assembly 39 also includes a portion, designated generally by reference character 51, which is adapted to fit within the respective inner conductor section 43. This is shown in greater detail in FIG. 3. This right-hand portion also provides a series of annular grooves 61-65 which function as explained hereinafter. Portion 51 however has an outer diameter slightly smaller than the inner diameter of the conductor 43 so that clearance is provided between these parts.

An annular separation is maintained between the coupler portion 51 and the inner coaxial conductor 43 by a pair of spaced Teflon (polytetraflouroethylene) rings 71 and 73 located in grooves 62 and 64. This arrangement thus establishes and maintains alignment of the inner conductor 43 relative to the portion 51 without electrical contact. Electrical contact between the coupler assembly 39 and the inner connector 43 is established at a single, well defined, axial position by means of a coiled wire spring 75. The wire forming spring 75 is coiled with an elliptical cross-section and is preferably silver plated to provide good electrical contact with both the coupler assembly 39 and the inner conductor 43. Such springs have been used heretofore in various connector environments and are conventionally referred to as watch band spring contacts.

As will be understood, the right-hand end of the inner conductor section 43 will be fixedly attached with respect to its corresponding outer conductor section by the next connector 17 in the series of coaxial sections in the same manner as the right-hand end of the inner conductor section 41. Thus, as differential expansion occurs between the inner and outer conductors, the left-hand end of the inner conductor 43 will move axially with respect to the coupler member 39. The Teflon rings 71 and 73 freely permit this axial movement while maintaining radial alignment and preventing electrical contact between the inner conductor 43 and the coupler assembly except as provided by the watch band spring contact 75.

A tubular shield 77 formed integrally with the coupler assembly 39 extends from an axial position adjacent the anchor insulator over the adjacent end of the inner conductor 43, to a point adjacent the groove 61 which holds the watch spring contact 75. The axial length of this shield 77 is greater than the amount of differential axial expansion expected between each inner conductor section 53 and the corresponding outer conductor section 23.

In other words, when the inner conductor 53 is least expanded with respect to the outer conductor 23, the left-hand end of the conductor will still be within the annular space defined by the field 77. Further, when the inner conductor 53 is maximally expanded with respect to the outer conductor 23, the end of the inner conductor will not reach the end or bottom of the space enclosed by the shield 77.

An intermediate step 78 is provided between the shield 77 and the groove 40 which receives the anchor insulator 39. The diameter of the groove 40, the step 78 and the shield 77 are selected in relation to each other to provide axial sections with offsetting impedance characteristics as is well understood in the connector art.

As indicated previously, the shield 77 is dimensioned to fit closely around the inner conductor 43 without contacting it. To more positively prevent any touching or arcing between the shield 77 and the end of the inner conductor 43, a short section of Teflon heat shrink tubing is applied over the end of the inner conductor 53 as indicated by reference character 81. The thickness of this tubing may be on the order of 0.020 inches.

From the foregoing, it will be understood by those skilled in the art that the shield 77 effectively masks or hides, from the r.f. electromagnetic field which exists between the inner and outer conductor, the variable gap which would otherwise be present between the movable end of the inner conductor 43 and the adjacent portion of the coupler assembly 39. Thus, differential expansion does not change any of the impedance discontinuities which exist at the connector. Accordingly, this connector assembly facilitates the implementation of multi-section runs of coaxial transmission line which exhibit stable characteristics over a broad band of frequencies.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. In a multi-section run of coaxial transmission line of the type having tubular inner and outer conductors, a connector which accommodates differential expansion between the inner and outer conductors in each section while minimizing changes in impedance, said connector comprising:

an annular anchor insulator;

extending through said insulator, a conductive member for electrically connecting the inner conductors of adjacent sections of said line;

on one side of said member, relative to said annular insulator, means for fixedly connecting to the respective inner conductor section;

on the other side of said member, relative to said annular insulator, a stub which will fit within the respective inner conductor section without contact, said stub being provided with a series of axially spaced annular grooves;

fitting within one said annular groove around said stub, an insulating ring which fits within and aligns the respective inner conductor section with said stub;

fitting within another said annular groove around said coupler, a annular metallic spring member which contacts and establishes an electrical connection between said member and the respective inner conductor section; and extending from said member, a tubular shield which overlies the adjacent end of the respective inner conductor section, the axial length of said shield being larger than the differential expansion which occurs between said inner and outer conductor sections.

2. In a multi-section run of coaxial transmission line of the type having tubular inner and outer conductors, a connector which accommodates differential expansion between the inner and outer conductors in each section while minimizing changes in impedance, said connector comprising:

an annular anchor insulator having an outer rim adapted to be held at the junction between the outer conductors of adjacent sections of said line and having also a central aperture;

extending through said aperature, a conductive member for electrically connecting the inner conductors of adjacent sections of said line;

on one side of said member, relative to said annular insulator, means for fixedly connecting to the respective inner conductor section;

on the other side of said member, relative to said annular insulator, a stub which will fit within the respective inner conductor section without contact, said stub being provided with a series of axially spaced annular grooves;

fitting within one said annular groove around said stub, an insulating ring which fits within and aligns the respective inner conductor section with said stub;

fitting within another said annular groove around said coupler, between said one annular groove and said anchor insulator a annular metallic spring member which contacts and establishes, at a predetermined axial position, an electrical connection between said member and the respective inner conductor section; and extending from an axial position on said coupler adjacent said anchor insulator, a tubular shield which overlies but does not electrically contact the adjacent end of the respective inner conductor section, the axial length of said shield being larger than the differential expansion which occurs between said inner and outer conductor sections.

3. A connector as set forth in claim 2 wherein said spring member comprises a wire coiled with an elliptical cross section.

4. A connector as set forth in claims 2 wherein said ring is polytetraflouroethylene.

5. A connector as set forth in claim 2 further comprising a length of insulating tubing covering the portion of the respective inner conductor which is overlaid by said shield.

6. In a multi-section run of coaxial transmission line of the type having tubular inner and outer conductors, a connector which accommodates differential expansion between the inner and outer conductors in each section while minimizing changes in impedance, said connector comprising:

an annular anchor insulator having an outer rim adapted to be held at the junction between the outer conductors of adjacent sections of said line and having also a central aperture;

extending through said aperature, a conductive member for electrically connecting the inner conductors of adjacent sections of said line;

on one side of said member, relative to said annular insulator, means for fixedly connecting to the respective inner conductor section;

on the other side of said member, relative to said annular insulator, a stub which will fit within the respective inner conductor section without contact, said stub being provided with a series of axially spaced annular grooves;

fitting within the annular groove closest to said anchor insulator, a watchband spring contact member which contacts and establishes, at a predetermined axial position, an electrical connection between said member and the respective inner conductor section;

fitting within spaced, other ones of said annular groove around said stub, respective insulating rings which fit within and align the respective inner conductor section with said stub;

extending from an axial position on said coupler adjacent said anchor insulator, a tubular shield which overlies but does not electrically contact the adjacent end of the respective inner conductor section, the axial length of said shield being larger than the differential expansion which occurs between said inner and outer conductor sections; and a length of insulating tubing covering the portion of the respective inner conductor which is overlaid by said shield.

* * * * *